United States Patent
Kwatra et al.

(10) Patent No.: US 11,159,467 B2
(45) Date of Patent: Oct. 26, 2021

(54) METHODS AND SYSTEMS FOR MANAGING CONTENT BASED ON PROXY UNDERSTANDING

(71) Applicant: INTERNATIONAL BUSINESS MACHINES CORPORATION, Armonk, NY (US)

(72) Inventors: Shikhar Kwatra, Durham, NC (US); Liam Harpur, Dublin (IE); Jeremy Fox, Georgetown, TX (US); Christopher Hardee, Raleigh, NC (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 16/241,752

(22) Filed: Jan. 7, 2019

(65) Prior Publication Data
US 2020/0220828 A1 Jul. 9, 2020

(51) Int. Cl.
| H04L 12/58 | (2006.01) |
| H04W 4/38 | (2018.01) |
| G06F 16/335 | (2019.01) |
| G06F 40/30 | (2020.01) |

(52) U.S. Cl.
CPC .......... *H04L 51/18* (2013.01); *G06F 16/337* (2019.01); *G06F 40/30* (2020.01); *H04L 51/22* (2013.01); *H04W 4/38* (2018.02)

(58) Field of Classification Search
CPC .......... H04L 51/18; H04L 51/22; H04W 4/38; G06F 16/337; G06F 40/30
See application file for complete search history.

(56) References Cited

U.S. PATENT DOCUMENTS

| 2008/0052364 | A1* | 2/2008 | Zhou ................... G06Q 10/107 709/206 |
| 2012/0143693 | A1* | 6/2012 | Chung ............... G06Q 30/0269 705/14.66 |
| 2014/0108309 | A1 | 4/2014 | Frank et al. |
| 2015/0295876 | A1* | 10/2015 | Newman .............. G06Q 10/107 709/206 |
| 2015/0332603 | A1 | 11/2015 | Aravkin et al. |
| 2016/0071151 | A1* | 3/2016 | Kramer ................ H04N 21/812 725/34 |
| 2016/0285810 | A1 | 9/2016 | Bai et al. |
| 2016/0337301 | A1* | 11/2016 | Rollins ................... H04L 51/02 |
| 2017/0345078 | A1* | 11/2017 | Guo .................... G06Q 30/0631 |
| 2018/0091453 | A1* | 3/2018 | Jakobsson ............... H04L 51/12 |

\* cited by examiner

*Primary Examiner* — Chris Parry
*Assistant Examiner* — Chouat Abderrahmen
(74) *Attorney, Agent, or Firm* — Griffiths & Seaton PLLC

(57) ABSTRACT

Embodiments for managing communications by one or more processors are described. A communication sent to a first individual is detected. A reaction score for the first individual consuming the communication is calculated based on at least one data source associated with at least one of the first individual and a second individual. The communication is caused to be rendered with an indication of the calculated reaction score by a computing node associated with the first individual.

15 Claims, 6 Drawing Sheets

METHODS AND SYSTEMS FOR MANAGING CONTENT BASED ON PROXY UNDERSTANDING

BACKGROUND OF THE INVENTION

Field of the Invention

The present invention relates in general to computing systems, and more particularly, to various embodiments for managing content based on a proxy understanding of the content.

Description of the Related Art

Users (or individuals) are sometimes reluctant to consume (e.g., read, listen to, watch, etc.) various types of communications or content, such as emails, text messages, etc., because of, for example, the sender (or creator) and/or a portion of the communication that is initially available. For example, in the case of email, a user may be hesitant to "open" an email because of the information about the email that is available to them (e.g., visible/readable) when the message is in their "inbox" (e.g., the name of the sender, the "subject line," etc.).

This may be the case because, for example, the user had a bad experience with the sender in the past, the subject line appears to indicate that the message is related to what the user considers a stressful subject, etc. Such situations may unnecessarily cause anxiety or stress to the user, and in some situations, may lead to the user missing important information.

SUMMARY OF THE INVENTION

Various embodiments for managing communications by one or more processors are described. In one embodiment, by way of example only, a method for managing communications, again by one or more processors, is provided. A communication sent to a first individual is detected. A reaction score for the first individual consuming the communication is calculated based on at least one data source associated with at least one of the first individual and a second individual. The communication is caused to be rendered with an indication of the calculated reaction score by a computing node associated with the first individual.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE DRAWINGS

Figure 1:
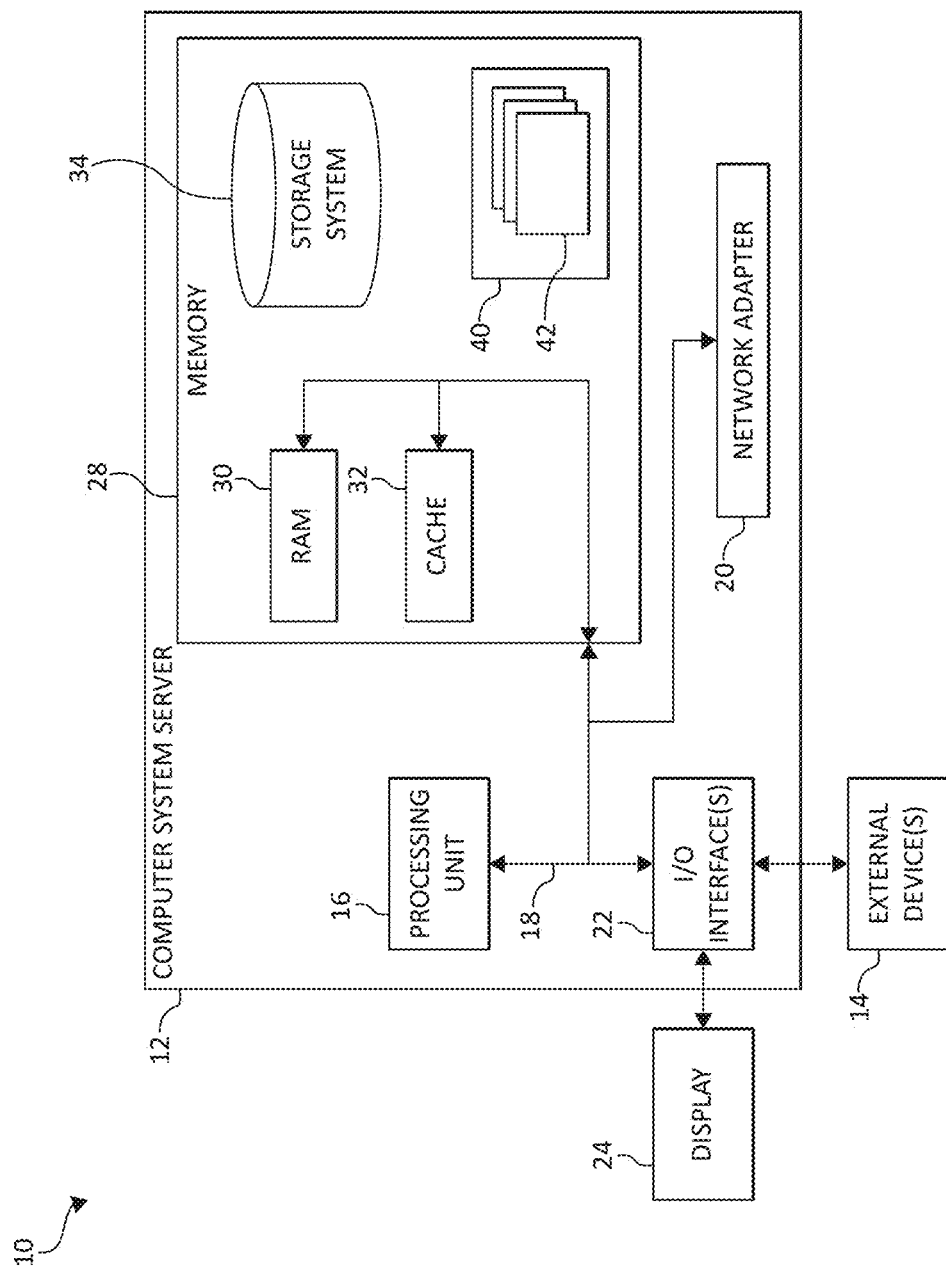
FIG. 1 is a block diagram depicting an exemplary computing node according to an embodiment of the present invention.

As discussed above, users (or individuals) are sometimes reluctant to consume (e.g., read, listen to, watch, etc.) various types of communications or content, such as emails, text messages, social media posts, etc., because of, for example, the sender (or creator) and/or a portion of the communication that is initially available. For example, in the case of email, a user may be hesitant to "open" an email because of the information about the email that is available to them (e.g., visible/readable) when the message is in their "inbox" (e.g., the name of the sender, the "subject line," etc.).

This may be the case because, for example, the user had a bad experience with the sender (or content creator) in the past or, in the case of an email, the subject line appears to indicate that the message is related to what the user considers a stressful subject (e.g., a financial issue, a family related matter, medical issue, etc.). Such situations may unnecessarily cause anxiety or stress to the user, and in some situations, may lead to the user missing important information.

To address these needs, in some embodiments, the methods and systems described herein identify (or create) a relevant intermediary (or intermediate user or virtual agent) that may be utilized as a benchmark for determining (or calculating, predicting, estimating, etc.) a reaction to content (e.g., a communication, message, etc.) that may be experienced by a user (e.g., the recipient of the communication) when they consume (e.g., read, listen to, watch, etc.) the content. The intermediary may be modeled based on (and/or include) the user (e.g., the recipient of the content) and/or other users (e.g., individuals besides the recipient). The intermediary may be utilized to calculate (or determined) a "reaction score" (or grade) for the user consuming the content. The reaction score may be generated on any suitable numerical scale (e.g., positive or negative integers or decimals) or may be determined as (and/or converted to) a grade (e.g., neutral, strongly negative, mildly positive, etc.).

That is, in some embodiments, an intermediary is identified or created that has a similar predisposition to reacting to content as the user (e.g., the recipient of an email). Before the content is made available to user, the content is sent to and/or processed by the intermediary, who (or which) generates a reaction to the content. The reaction may be recorded, and the content may then be made available (e.g., sent) to the user in a modified manner such that an indication (e.g., a user interface (UI) cue) of the user's expected reaction to the content is provided to the user (e.g., in the case of an email, before they open/select/accept the email). The indication may provide a warning to the user regarding the nature of the content or help put the user at ease regarding the content (e.g., "Joe, who is also usually averse to topic XYZ, actually had no problem with this content . . . ).

As such, if appropriate (e.g., if the calculated reaction score exceeds a threshold), the system may modify the communication (or other type of content) when rendered by a computing node of the user in such a way as to notify the user of their expected response (or reaction) to consuming the content. For example, if an email is sent to (or received by) a user (e.g., User A), the system may append (or change) the email (e.g., the subject line thereof) in such a way as to indicate that the reaction (or expected/calculated reaction) to the email of another user (e.g., User B or a virtual agent) was (or is) that of "calmness" (or was expected/calculated to be that of calmness). With the email shown (e.g., in an "inbox" of the user) with the appended reaction information, the user may be more inclined to consume (e.g., open or accept) the email.

In some embodiments, such a change to the content (or message) is performed only if the system determines (e.g., based on various data sources associated with the user, such as reactions to other/previous content) that the user may have a negative reaction to the content or may at least be reluctant to consume the content because of, for example, the creator of the content (e.g., the sender of the message) and/or a portion of the content (e.g., the subject line of an email, content within the body of the email, etc).

In some embodiments, when the content is rendered by a computing node of the user (e.g., shown in their email inbox), the indicated content creator is changed (e.g., the sender of the email is changed to, for example, a different sender, a virtual agent, etc.). In such embodiments, when the content is consumed by the user (e.g., the user opens an email from their inbox), the original creator is made apparent (e.g., shown in the body of the email), perhaps along with the reaction of the intermediary (e.g., the calculated/estimated reaction of the intermediary).

Although some embodiments described herein are described as being utilized with respect to emails, it should be understood that the methods and systems may be applicable to other types of content or communications, such as text messages, messages sent through messaging applications, and various types of online content (e.g., social media activity/posts, websites, etc), as well as audio content (e.g., voicemails, audio files, etc.) and visual/video content (e.g., images, videos, etc.).

In some embodiments, the management of communications described herein is performed utilizing an analysis of at least one data source associated with the user (e.g., the primary user or the recipient of the content/message) and/or other individuals (e.g., secondary user or users other than the recipient of the content/message). The data sources may include data related to reactions of the user(s) to consuming various types of content. For example, the data sources may include data related to reactions of the primary user (e.g., the recipient) to previously consumed content (e.g., read messages) and/or the reactions of (one or more) secondary users to previously consumed content and/or reactions to the content in question (e.g., a particular email sent to/read by the secondary user(s) by not yet read/opened by the primary user). The data related to the reactions of the user(s) may be collected by sensors, such as cameras (e.g., facial expression/mood detection) and biometric sensors (e.g., heart rate, blood pressure, etc. monitors on wearable devices). Also, communications (e.g., emails, text messages, social media activity, etc.) of the user(s) may be monitored for indications of the user(s) reaction(s).

As such, it should be understood that the methods and systems described herein may utilize any data (or data sources) associated with the user(s) accessible by the system (perhaps with the permission or authorization of the user and/or an administrator). In some embodiments, a profile (e.g., a cognitive profile) for the user(s) may be generated. Data sources that may be use used to generate a cognitive profile for the user(s) may include any appropriate data sources associated with the user that are accessible by the system. Examples of such data sources include, but are not limited to, communication sessions and/or the content (or communications) thereof (e.g., phone calls, video calls, text messaging, emails, in person/face-to-face conversations, etc.), a profile of (or basic information about) the user (e.g., job title, place of work, length of time at current position, family role, use preferences, etc.), a schedule or calendar (i.e., the items listed thereon, time frames, etc.), projects (e.g., past, current, or future work-related projects), location (e.g., previous and/or current location and/or location relative to other users), social media activity (e.g., posts, reactions, comments, groups, etc.), browsing history (e.g., web pages visited), and online purchases.

In some embodiments, some of the data utilized is detected by sensors, such as cameras, microphones, biometric sensors, motion sensors, and wireless transceivers (e.g., wireless communications to detect the presence of computing devices), which may be integrated into a computing device associated with the computing environment (e.g., a desktop PC or laptop computer) or another computing device (e.g., a wearable device, such as a smart watch) and/or separate from such devices (e.g., security cameras).

In some embodiments, the methods and systems described herein utilize a cognitive analysis that is performed on the available data sources. The cognitive analysis may include classifying natural language, analyzing tone, analyzing sentiment, and analyzing semantic content (e.g., scanning for keywords, key phrases, etc.) with respect to, for example, content sent to and/or received by the users and/or other available data sources. In some embodiments, natural language processing (NLP), Mel-frequency cepstral coefficients (MFCCs), and/or region-based convolutional neural network (R-CNN) pixel mapping (e.g., for images/videos), as are commonly understood, are used.

As such, in some embodiments, the methods and/or systems described herein may utilize a "cognitive analysis," "cognitive system," "machine learning," "cognitive modeling," "predictive analytics," and/or "data analytics," as is commonly understood by one skilled in the art. Generally, these processes may include, for example, receiving and/or retrieving multiple sets of inputs, and the associated outputs, of one or more systems and processing the data (e.g., using a computing system and/or processor) to generate or extract models, rules, etc. that correspond to, govern, and/or estimate the operation of the system(s), or with respect to the embodiments described herein, the management of communications with respect to, for example, the calculated or predicted reactions of users. Utilizing the models, the performance (or operation) of the system (e.g., utilizing/based on new inputs) may be predicted and/or the performance of the system may be optimized by investigating how changes in the input(s) effect the output(s). Over time, the methods and systems described herein may determine correlations (or insights) between users' interaction with the computing environments (or at least some channels utilized therethrough), perhaps with feedback provided by the users, that allow for the performance of the system to improve with continued use.

It should be understood that as used herein, the terms "computing node" (or simply "node") and/or "channel" may refer to a computing device, such as a mobile electronic device or a desktop computer, and/or an application, such a work space application, a messaging application, a virtual meeting application, a chatbot, an email application, a social media application, a web browser, etc. In other words, as used herein, examples of computing nodes include, for example, computing devices such as mobile phones, tablet devices, desktop computers, or other devices, such as appliances (IoT appliances) that are owned and/or otherwise associated with individuals (or users), and/or various applications that are utilized by the individuals on such computing devices.

In particular, in some embodiments, a method for managing communications by one or more processors is provided. A communication sent to a first individual is detected. A reaction score for the first individual consuming the communication is calculated based on at least one data source associated with at least one of the first individual and a second individual. A signal representative of the calculated reaction score is generated.

The communication may be caused to be rendered with an indication of the calculated reaction score by a computing node associated with the first individual. The communication may be sent to the first individual from a sender. The communication may be caused to be rendered with a computing node associated with the first individual with an indication that the communication was sent by a second sender. The communication may include at least one of an email, a text message, and a message sent through a messaging application.

The at least one data source may include data associated with a reaction of at least one of the first individual and the second individual to consuming content. At least some of the data associated with the reaction of the at least one of the first individual and the second individual may be detected by at least one sensor.

The calculating of the reaction score for the first individual consuming the communication may be performed utilizing natural language processing. The calculating of the reaction score for the first individual consuming the communication may be performed utilizing a cognitive analysis.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment, such as cellular networks, now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 (and/or one or more processors described herein) is capable of being implemented and/or performing (or causing or enabling) any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random-access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, system memory 28 may include at least one program product having a set (e.g., at least one) of program modules that are configured to carry out the functions of embodiments of the invention.

Program/utility 40, having a set (at least one) of program modules 42, may be stored in system memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples include, but are not limited to: microcode, device drivers, redundant processing units, external disk drive arrays, RAID systems, tape drives, and data archival storage systems, etc.

In the context of the present invention, and as one of skill in the art will appreciate, various components depicted in FIG. 1 may be located in, for example, personal computer systems (e.g., desktop PCs), server computer systems, thin clients, thick clients, hand-held or laptop devices, multiprocessor systems, microprocessor-based systems, set top boxes, programmable consumer electronics, network PCs, mobile electronic devices such as mobile (or cellular and/or smart) phones, personal data assistants (PDAs), tablets, wearable technology devices, laptops, handheld game consoles, portable media players, etc., as well as computing systems in vehicles, such as automobiles, aircraft, watercrafts, etc. However, in some embodiments, some of the components depicted in FIG. 1 may be located in a computing device in, for example, a satellite, such as a Global Position System (GPS) satellite. For example, some of the processing and data storage capabilities associated with mechanisms of the illustrated embodiments may take place locally via local processing components, while the same components are connected via a network to remotely located, distributed computing data processing and storage components to accomplish various purposes of the present invention. Again, as will be appreciated by one of ordinary skill in the art, the present illustration is intended to convey only a subset of what may be an entire connected network of distributed computing components that accomplish various inventive aspects collectively.

Figure 2:
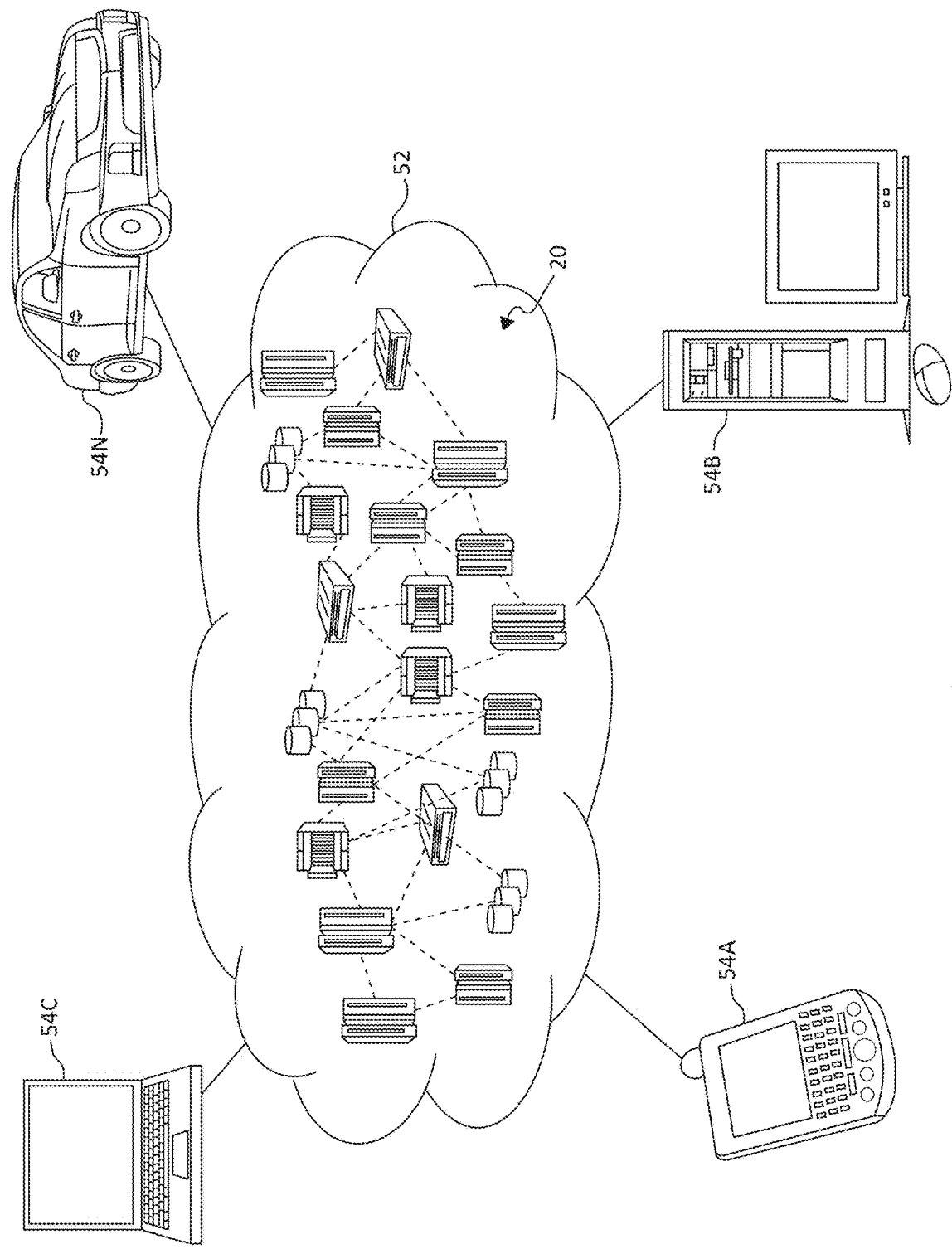
FIG. 2 is an additional block diagram depicting an exemplary cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, cellular (or mobile) telephone or PDA 54A, desktop computer 54B, laptop computer 54C, and vehicular computing system (e.g., integrated within automobiles, aircraft, watercraft, etc.) 54N, may communicate.

Still referring to FIG. 2, nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
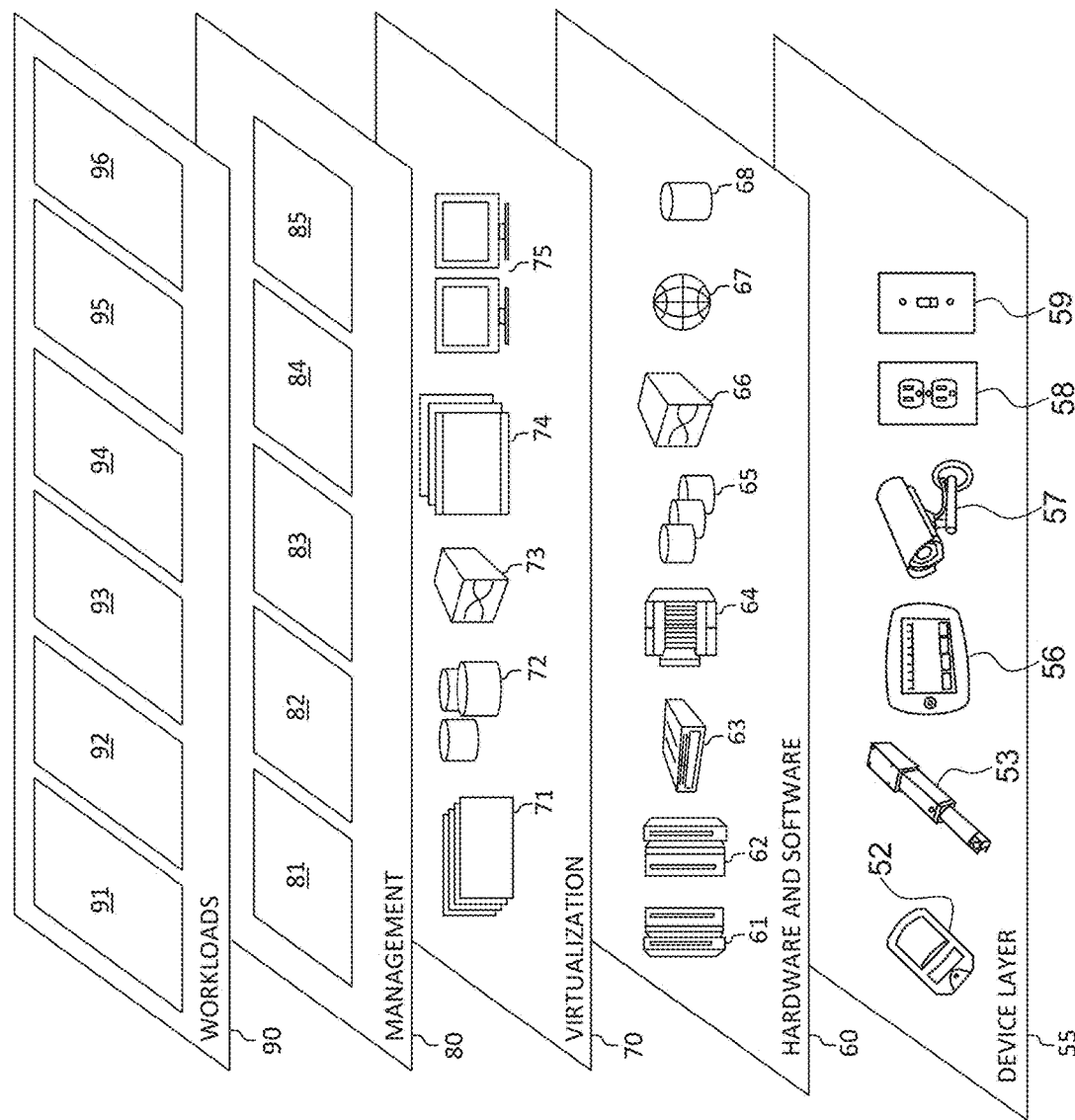
FIG. 3 is an additional block diagram depicting abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Device layer 55 includes physical and/or virtual devices, embedded with and/or standalone electronics, sensors, actuators, and other objects to perform various tasks in a cloud computing environment 50. Each of the devices in the device layer 55 incorporates networking capability to other functional abstraction layers such that information obtained from the devices may be provided thereto, and/or information from the other abstraction layers may be provided to the devices. In one embodiment, the various devices inclusive of the device layer 55 may incorporate a network of entities collectively known as the "internet of things" (IoT). Such a network of entities allows for intercommunication, collection, and dissemination of data to accomplish a great variety of purposes, as one of ordinary skill in the art will appreciate.

Device layer 55 as shown includes sensor 52, actuator 53, "learning" thermostat 56 with integrated processing, sensor, and networking electronics, camera 57, controllable household outlet/receptacle 58, and controllable electrical switch 59 as shown. Other possible devices may include, but are not limited to, various additional sensor devices, networking devices, electronics devices (such as a remote control device), additional actuator devices, so called "smart" appliances such as a refrigerator, washer/dryer, or air conditioning unit, and a wide variety of other possible interconnected devices/objects.

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provides cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provides pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and, in the context of the illustrated embodiments of the present invention, various workloads and functions 96 for managing communications (or content) as described herein. One of ordinary skill in the art will appreciate that the workloads and functions 96 may also work in conjunction with other portions of the various abstractions layers, such as those in hardware and software 60, virtualization 70, management 80, and other workloads 90 (such as data analytics processing 94, for example) to accomplish the various purposes of the illustrated embodiments of the present invention.

As previously mentioned, in some embodiments, the methods and systems described herein identify (or create) a relevant intermediary (or intermediate user or virtual agent) that may be utilized as a benchmark for determining a reaction to content (e.g., a communication, message, etc.) that may be experienced by a user (e.g., the recipient of the communication) when they consume (e.g., read, listen to, watch, etc.) the content. The intermediary may be modeled based on (and/or include) the user (e.g., the recipient of the content) and/or other users (e.g., individuals besides the recipient). The intermediary may be utilized to calculate (or determined) a "reaction score" (or grade) for the user consuming the content. If appropriate (e.g., if the calculated reaction score exceeds a threshold), the system may modify the communication when rendered by a computing node of the user in such a way as to notify the user of their expected response (or reaction) to consuming the content.

For example, if an email is sent by a first user (e.g., User A) to a second user (e.g., User B), the system may append (or change) the email (e.g., the subject line thereof) in such a way as to indicate that the reaction (or expected/calculated reaction) to the email of another user (e.g., User C or a virtual agent) was (or is) that of "calmness" (or was expected/calculated to be that of calmness). With the email shown (e.g., in an "inbox" of the user) with the appended reaction information, the user may be more inclined to consume (e.g., open or accept) the email. Likewise, if appropriate, the indication may provide a warning to the recipient regarding its contents.

In some embodiments, as a (primary) user experiences interaction with more (secondary/other) users and/or the system is provided with data related to how the other users react to content, the potential library of "potential senders" (or intermediaries, virtual agents, users upon which a virtual agent is modeled, etc.) for the primary user is expanded. The interaction may include the primary user consuming (and/or the system analyzing) content created by the other users, which may include content created in reaction to other content (e.g., a social media post created in response to another user consuming content). Such may be utilized to generate a signature (or profile) for the other users with respect to how they react to various types of content, which may be utilized by the methods and systems described herein. The system may score or grade the various behavior and characteristics of secondary users from the perspective of the primary user (e.g., the behavior/reaction of a particular secondary user as observed by the primary user). For example, the system may assign an angry emotional tone score of 0.7 to a particular secondary user based on what the primary user has observed of that particular secondary user.

In some embodiments, the system monitors the reaction of one or more users (e.g., a primary user and/or secondary user(s)) to received or consumed communications (or other types of content). As one example, the communications may be emails. For example, a first user may send an email to a second user (e.g., the primary user). The system may utilize various data related to the sending of the email to the second user to determine the impact the email has on the second user.

In some embodiments, a machine learning classification model is utilized to tie (or correlate) the recipient's (e.g., the second user's) reaction/response to the content of the email (or other communication or type of content). In some embodiments, the system may utilize sensor data and NLP processing as parameters (or input). For example, various sensors may be utilized to collect data that may be utilized to determine the reaction of the recipient to the email. The sensor data (or feeds) may include data that is collected by various sensors (e.g., IoT sensors), such as cameras, microphones, biometric sensors (e.g., on wearable devices), and any other sensors in a suitable proximity to monitor the user. For example, cameras may be utilized for gaze detection (e.g., determining where the user is looking), facial recognition, and mood detection. Biometric sensors, such as heart rate and blood pressure monitors, on wearable devices (e.g., smart watches) may also be utilized (e.g., to determine mood, stress levels, etc.). Other data that may be utilized to determine the reaction of the user(s) may include, for example, communications (e.g., emails, text messages, phone calls, etc.) and online activity (e.g., social media activity) of the user(s) after consuming the content. Such data may be utilized to detect the response/reaction of the recipient (or viewer) in correlation with the specific type of content.

The NLP processing may include, for example, keyword extraction and semantic analysis performed on the email (or other type of content/communication). For example, the content may be tagged with relevant metadata and keywords may be extracted to create metadata of relevant information.

In some embodiment, semantic analysis using "emotion dictionaries" (or an emotion dictionary module) may be utilized. For example, quantitative content analysis may be performed on a sentence or phrase-level (e.g., using n-grams). The dictionaries may be based on the (average) evaluations of the emotional content of individual words by humans using a semantic differential scale (e.g., rating of words on three major dimensions: valence, arousal, and dominance), as is commonly understood.

The above may be utilized to determine or understand the impact of various types of content on the user. In some embodiments, the system determines if the impact is above a statistical threshold that may be ascertained with a known bell curve or probability, and if so, the particular user and/or content may undergo further processing. For example, the system may determine that a score of 0.86 is statistically significant in terms of negative effect.

In some embodiments, the parameters discussed above, along with configurable weights, are fed into a multi-level neural network classifier module, which is in turn fed into the next layer which may utilize a contextual situation analysis (e.g., a contextual situation analysis module). The contextual situation analysis is performed to understand the current (and/or previous) reactions/responses/cognitive behavior of the user(s) with respect to the situation or surroundings when consuming the content (e.g., reading an email, viewing a social media post, etc.). The contextual situation analysis may be based on (and/or utilize) various types of data, such as which device the user utilizes to consume the content (e.g., a desktop PC, mobile phone, laptop, etc.), the user's location, time of day, weather conditions, schedule/calendar data, etc.

The output layer of the model may include (and/or utilize) a correlation engine that may determine the pattern history of the user in correlation with the previous layers to correlate the responses of the user(s) (individualized or as a group) with respect to the analyzed content. As such, the learning mechanism described above may understands the predisposition of users (e.g., the primary user and/or secondary users) to experience a negative reaction to consuming various types of content.

The learning mechanism (or system) may act as the intermediary or virtual agent described above and may be utilized as a personalized content, emotion, and/or reaction analysis system. That is, the system may be used (e.g., as a benchmark) to determine (or estimate) a reaction a particular user may have in response to consuming a particular piece of content (e.g., based on the previous experiences of that user and/or other users). More specifically, in some embodiments, the content may be sent to and/or processed by the learning mechanism (or virtual agent) before being sent (or made available) to the primary user to determine or estimate the likely reaction of the primary user.

In some embodiments, a reaction score for a particular user consuming a piece of content (e.g., a user to which an email has been sent) is determined or calculated. If the reaction score is above a predetermined threshold (e.g., the system determines there is a relatively high chance that the user will have a significantly negative reaction to consuming the content), the content is appended or changed before the user consumes it (or the user is provided with some other appropriate user interface (UI) cue).

For example, in the case of an email, before the email is made accessible to the user (e.g., appears in the user's inbox), the sender of the email may be changed and/or the subject line of the email may be modified (e.g., to indicate the determined/estimated reaction of the user to reading the email). As a particular example, consider a scenario in which "User A" sends an email to "User B," which has the subject line "Regarding tax payments." After processing the email, if the system determines that User B is likely to have a negative reaction to the email, the email may be shown in User B's inbox as being sent from "User C" (which may be the name of an acquaintance, contact, friend, etc. of User B) or "Virtual message agent" with a subject line of "User C did not have a negative emotional reaction to this email" or "The content of this email has been determined to not be disturbing." That is, the intermediary or virtual agent has essentially commented on the content, allowing the primary user to have an idea of their likely reaction to the content.

In some embodiments, when the content (or communication) is opened or selected by the recipient, the original sender (e.g., User A), or in embodiments involving content other than emails, the content creator, is made apparent in (or added to) the content. Additionally, in some embodiments, the reaction of the intermediate user may be specified. For example, if the content is an email that has been modified such that User C is shown as the sender when the email appears in User B's inbox, the email may be appended with a notification that the original sender was User A and/or User C's (e.g., the virtual agent's) reaction is described (e.g., in embodiments in which the reaction was not indicated before the content is selected/opened). As a user experiences more users, the potential library of potential senders is expanded. Gap analysis may be based on real data or based on a model of that user. In some embodiments, it is based on a simulated user.

Figure 4:
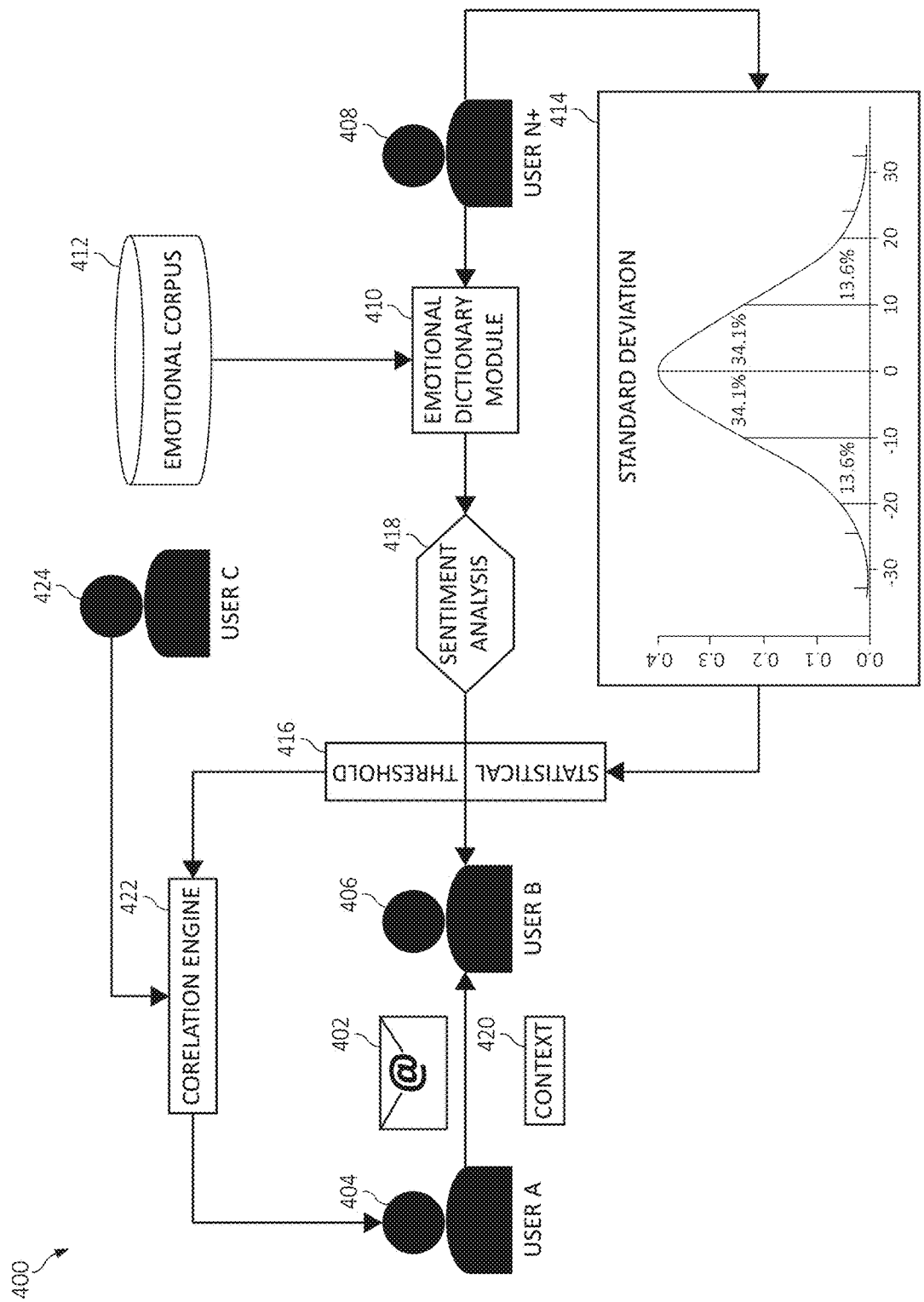
FIG. 4 is a flow chart/block diagram of a system and/or method for managing communications.

FIG. 4 illustrates a flow chart/block diagram of a system (and/or method) 400 for managing communications (or content) according to some embodiments of the present invention, which may implement at least some of the aspects of functionality described above. In the depicted embodiment, an email 402 is sent from a first user 404 (e.g., User A) to a second user 406 (e.g., User B). Data from multiple users 408 (e.g., User N+) is fed into an emotional dictionary module 410, along with data from an emotional corpus 412, and is utilized to determine a standard deviation 414, which is in turn utilized to set a statistical threshold 416, as described above. The emotional dictionary module 410 is utilized to perform sentiment analysis 418 on the email 402, along with a contextual analysis 420 performed on the second user's 406 receipt of the email 402. A correlation engine 422 may be used to determine the pattern history of the user in correlation with the available data (as described above) to correlate the user's (individualized or cohort) response with respect to the analyzed message content.

Figure 5:
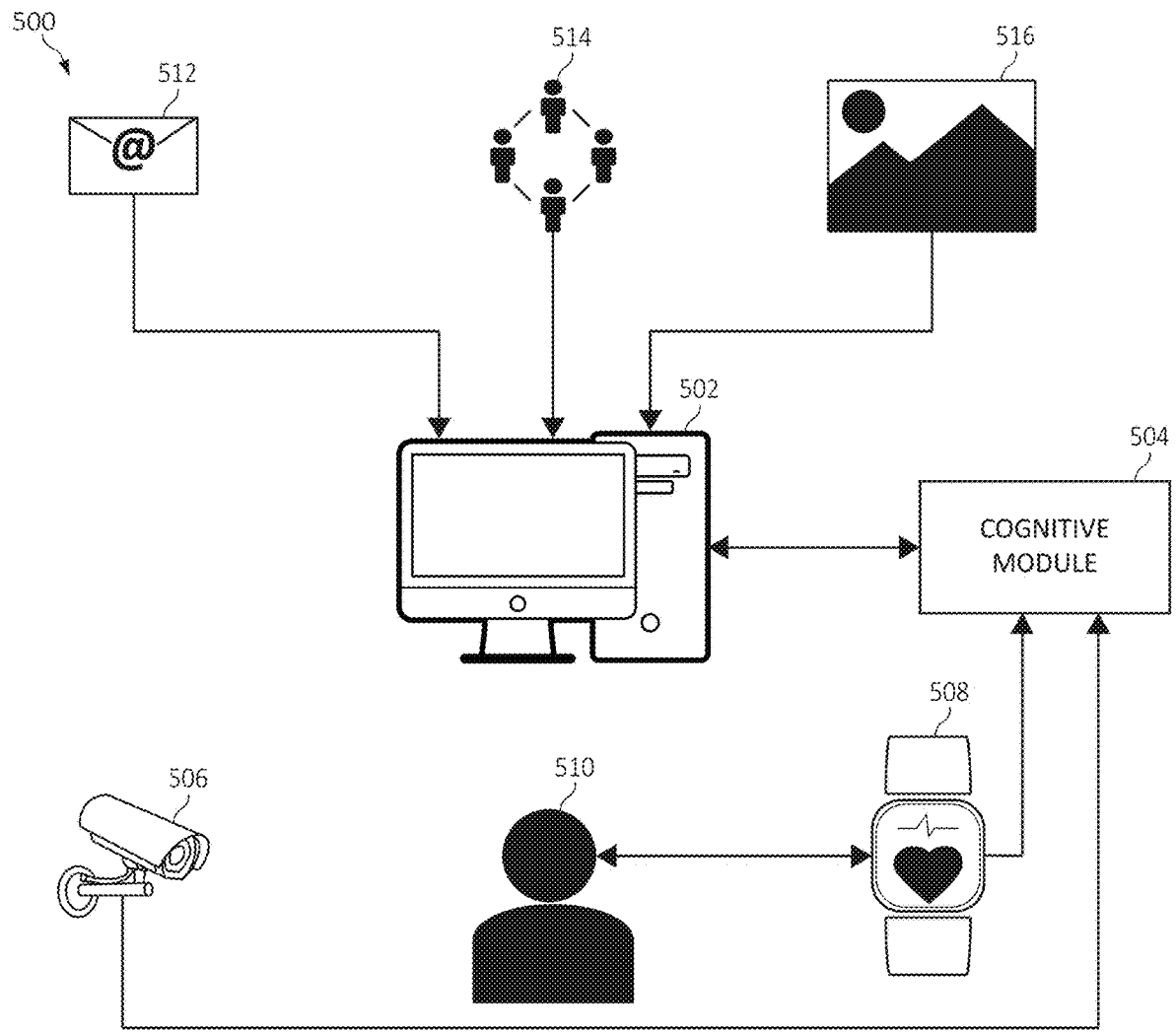
FIG. 5 is a simplified block diagram of a computing environment according to an embodiment of the present invention.

FIG. 5 illustrates an exemplary computing environment 500 according to some embodiments of the present invention. The computing environment 500 includes a computing device 502, a cognitive module 504, at least one sensor 506, and a wearable device 508. The computing device 502 may be any suitable computing device through which a user 510 may consume content, such as emails 512, social media posts/activity 514, and images 516. In the depicted embodiment, the computing device 502 is a desktop PC. However, in other embodiments, the computing device 502 may be (or include) other devices, such as laptop computers, mobile phones, tablet devices, etc. Also, as described above, although only one computing device 502 is shown in FIG. 5, in some embodiments, the methods and system described herein may be applied to computing environments in which the user(s) 510 utilizes multiple devices (e.g., a desktop PC and a laptop computer).

The cognitive module (or control system) 504 may include (and/or be implemented with) any suitable computing device or system, such as those described above, and may be configured to perform the management of communications or content and/or any associated cognitive analysis, as described herein. The cognitive module 504 may be in operable communication with the computing device 502 (and/or content, applications, channels, etc. utilized by the computing device 502), the sensor 506, and the wearable device 508. Although the cognitive module 504 is shown as a separate component in FIG. 5, it should be understood that in some embodiments the cognitive module 504 may be integrated into another computing device (e.g., the computing device 502 or a remote device/server).

The sensor 506 may include any suitable sensor that is capable of monitoring the user 510, as described above. In some embodiments, the sensor 506 includes a camera and/or a microphone. The wearable device 508 may be any suitable wearable technology device, such as a smart watch, that may be utilized to perform additional monitoring of the user 510. For example, the wearable device 508 may include, for example, a heart rate and/or blood pressure monitor.

Figure 6:
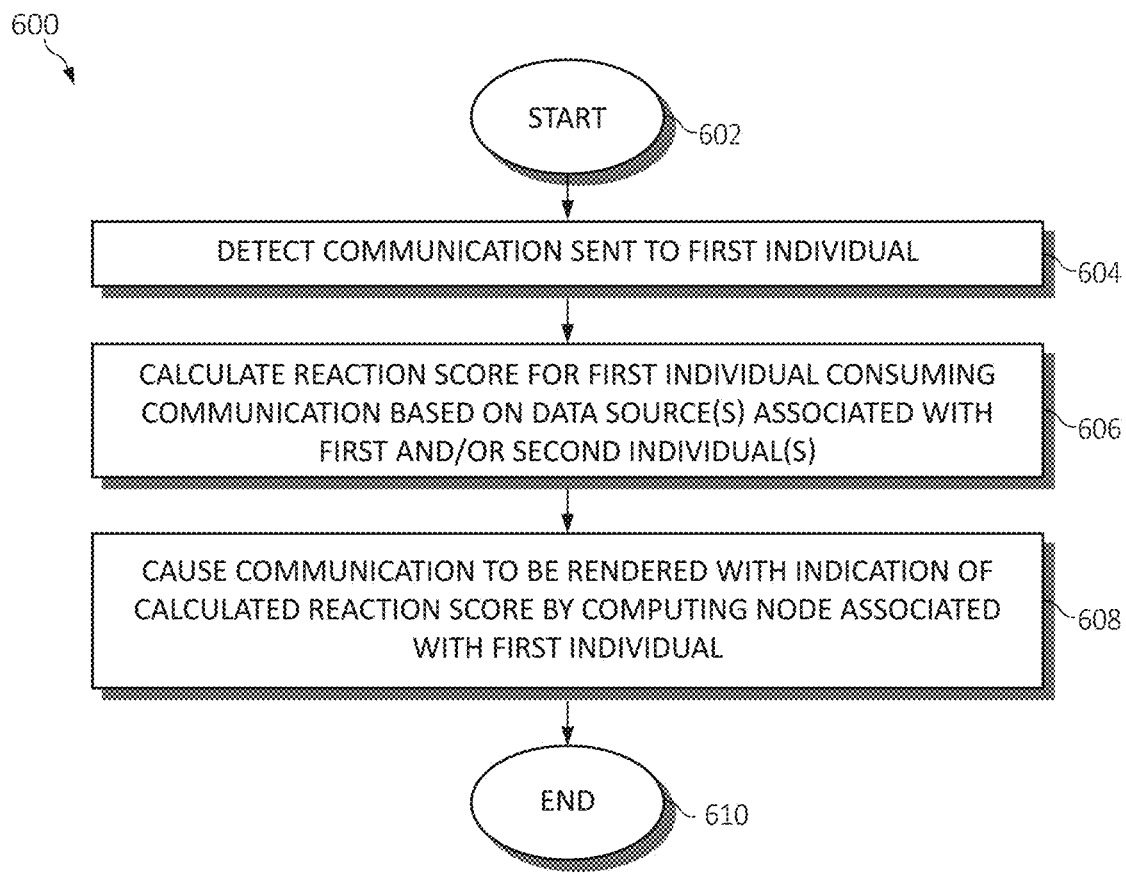
FIG. 6 is a flowchart diagram of an exemplary method for managing communications according to an embodiment of the present invention.

Turning to FIG. 6, a flowchart diagram of an exemplary method 600 for managing communications (or content), in accordance with various aspects of the present invention, is provided. Method 600 begins (step 602) with, for example, data associated with one or more individuals (or users) consuming (e.g., reading, viewing, etc.) various content or communications (e.g., emails, messages, social media activity) being collected (and/or monitored).

A communication sent (or content made available) to a first individual is detected (step 604). The communication may include at least one of an email, a text message, and a message sent through a messaging application. The communication may be sent to the first individual from a sender.

A reaction score (or grade) for (or expected reaction of) the first individual consuming the communication is calculated (or determined) based on at least one data source associated with at least one of the first individual and a second individual (step 606). The at least one data source may include data associated with a reaction of at least one of the first individual and the second individual to consuming content. The data associated with the reaction of at least one of the first individual and the second individual to consuming content may be detected by at least one sensor (e.g., a camera, microphone, biometric sensor, etc.). The calculating of the reaction score for the first individual consuming the communication may be performed utilizing natural language processing. The calculating of the reaction score for the first individual consuming the communication may be performed utilizing a cognitive analysis.

The communication is caused to be rendered with an indication of the calculated reaction score by a computing node associated with the first individual (step 608). The communication may be caused to be rendered by the computing node with an indication that the communication was sent by a second sender (e.g., a different sender than the first sender or a virtual agent).

Method 600 ends (step 610) with, for example, feedback being received from the user. The feedback may be collected by monitoring the reactions, behavior, etc. of the user and/or via explicit feedback. As such, the feedback may be utilized to improve performance of the system over time.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowcharts and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowcharts and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowcharts and/or block diagram block or blocks.

The flowcharts and block diagrams in the figures illustrate the architecture, functionality, and operation of possible implementations of systems, methods, and computer program products according to various embodiments of the present invention. In this regard, each block in the flowcharts or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts or carry out combinations of special purpose hardware and computer instructions.

The invention claimed is:

1. A method, by one or more processors, for managing communications:
   detecting a communication sent to a first individual, wherein the communication is sent to the first individual from a sender;
   calculating a reaction score for the first individual consuming the communication based on at least one data source associated with at least one of the first individual and a second individual, wherein the reaction score is automatically calculated according to a cognitive analysis of the at least one data source utilizing at least one of a plurality of machine learning algorithms; and causing the communication to be rendered with an indication of the calculated reaction score by a computing node associated with the first individual, wherein, when the calculated reaction score is above a predetermined threshold, the rendering of the communication includes:

modifying the communication to display that the communication was sent by the second individual, and displaying, as the indication of the calculated reaction score, a modified subject line of the communication to indicate a reaction to the communication by the second individual based on the at least one data source.

2. The method of claim 1, wherein the at least one data source includes data associated with a reaction of at least one of the first individual and the second individual to consuming content.

3. The method of claim 2, wherein at least some of the data associated with the reaction of the at least one of the first individual and the second individual to consuming content is detected by at least one sensor.

4. The method of claim 1, wherein the calculating of the reaction score for the first individual consuming the communication is performed utilizing natural language processing.

5. The method of claim 1, wherein the communication includes at least one of an email, a text message, and a message sent through a messaging application.

6. A system for managing communications:

at least one processor that detects a communication sent to a first individual, wherein the communication is sent to the first individual from a sender;

calculates a reaction score for the first individual consuming the communication based on at least one data source associated with at least one of the first individual and a second individual, wherein the reaction score is automatically calculated according to a cognitive analysis of the at least one data source utilizing at least one of a plurality of machine learning algorithms; and causes the communication to be rendered with an indication of the calculated reaction score by a computing node associated with the first individual, wherein, when the calculated reaction score is above a predetermined threshold, the rendering of the communication includes:

modifying the communication to display that the communication was sent by the second individual, and displaying, as the indication of the calculated reaction score, a modified subject line of the communication to indicate a reaction to the communication by the second individual based on the at least one data source.

7. The system of claim 6, wherein the at least one data source includes data associated with a reaction of at least one of the first individual and the second individual to consuming content.

8. The system of claim 7, wherein at least some of the data associated with the reaction of the at least one of the first individual and the second individual to consuming content is detected by at least one sensor.

9. The system of claim 6, wherein the calculating of the reaction score for the first individual consuming the communication is performed utilizing natural language processing.

10. The system of claim 6, wherein the communication includes at least one of an email, a text message, and a message sent through a messaging application.

11. A computer program product for managing communications by one or more processors, the computer program product comprising a non-transitory computer-readable storage medium having computer-readable program code portions stored therein, the computer-readable program code portions comprising:

an executable portion that detects a communication sent to a first individual, wherein the communication is sent to the first individual from a sender;

an executable portion that calculates a reaction score for the first individual consuming the communication based on at least one data source associated with at least one of the first individual and a second individual, wherein the reaction score is automatically calculated according to a cognitive analysis of the at least one data source utilizing at least one of a plurality of machine learning algorithms; and an executable portion that causes the communication to be rendered with an indication of the calculated reaction score by a computing node associated with the first individual, wherein, when the calculated reaction score is above a predetermined threshold, the rendering of the communication includes:

modifying the communication to display that the communication was sent by the second individual, and displaying, as the indication of the calculated reaction score, a modified subject line of the communication to indicate a reaction to the communication by the second individual with respect to the communication based on the at least one data source.

12. The computer program product of claim 11, wherein the at least one data source includes data associated with a reaction of at least one of the first individual and the second individual to consuming content.

13. The computer program product of claim 12, wherein at least some of the data associated with the reaction of the at least one of the first individual and the second individual to consuming content is detected by at least one sensor.

14. The computer program product of claim 11, wherein the calculating of the reaction score for the first individual consuming the communication is performed utilizing natural language processing.

15. The computer program product of claim 11, wherein the communication includes at least one of an email, a text message, and a message sent through a messaging application.

* * * * *